United States Patent [19]
Lampe

[11] Patent Number: 5,267,595
[45] Date of Patent: Dec. 7, 1993

[54] PNEUMATIC VEHICLE TIRE HAVING TWO-LAYER SIDEWALL

[75] Inventor: Gerhard Lampe, Hanover, Fed. Rep. of Germany

[73] Assignee: Continental Aktiengesellschaft, Hanover, Fed. Rep. of Germany

[21] Appl. No.: 700,529

[22] Filed: May 14, 1991

[30] Foreign Application Priority Data

Jun. 28, 1990 [DE] Fed. Rep. of Germany ....... 4020531

[51] Int. Cl.$^5$ ............................................. B60C 13/00
[52] U.S. Cl. ..................................... 152/525; 152/543
[58] Field of Search ................ 152/525, 524, 555, 539, 152/543

[56] References Cited

U.S. PATENT DOCUMENTS

| | | | |
|---|---|---|---|
| 3,937,862 | 2/1976 | Dillenschneider | 152/525 |
| 4,007,069 | 2/1977 | Takayanagi et al. | 156/130 |
| 4,444,608 | 4/1984 | Jones | 156/130 |

FOREIGN PATENT DOCUMENTS

| | | | |
|---|---|---|---|
| 1-083410 | 3/1989 | Japan | 152/525 |
| 1-278805 | 11/1989 | Japan | 152/525 |
| 2-162102 | 6/1990 | Japan | 152/525 |

*Primary Examiner*—Geoffrey L. Knable
*Attorney, Agent, or Firm*—Robert W. Becker & Associates

[57] ABSTRACT

A pneumatic vehicle tire of rubber or rubber-like synthetic material. The tire has a carcass that is anchored in bead regions by being looped around inextensible bead cores. A reinforcing belt is disposed between the carcass and a tread strip. Respective bead rubber members extend around the bead regions. Respective sidewall rubber portions are disposed on laterally outer sides of the carcass and essentially extend from the bead rubber members to shoulder regions of the tire. Each of the sidewall rubber portions comprises two distinct rubber layers of different mixture compositions, namely an outer sidewall rubber layer that is resistant to the effects of ozone, is wear-resistant, and is readily moldable, and an inner sidewall rubber layer that is designed to achieve an increased transfer of forces.

6 Claims, 1 Drawing Sheet

PNEUMATIC VEHICLE TIRE HAVING TWO-LAYER SIDEWALL

BACKGROUND OF THE INVENTION

The present invention relates to a pneumatic vehicle tire of rubber or rubber-like synthetic material, i.e. elastomeric material, with said tire including: a carcass that is anchored in bead regions by being looped around inextensible bead cores; a conventional reinforcing belt disposed between the carcass and a tread strip; respective bead rubber members that each extend around one of the bead regions; and respective sidewall rubber portions that are disposed on laterally outer sides of the carcass and essentially extend from the bead rubber members to shoulder regions of the tire. The present invention also relates to methods of producing such tires.

With heretofore known pneumatic vehicle tires, the sidewall rubber portions that are disposed on laterally outer sides of the carcass are a unitary component that has a specific rubber mixture composition. This mixture is intended to provide lasting bending stress or flexure. This is generally a relatively soft or yielding mixture, which furthermore must be resistant to the effects of ozone and must have good flow characteristics so that the written material and technical data that is present in the sidewall region can be formed in a visually satisfactory manner.

This known sidewall mixture is not very suitable for being able to have different effects upon the tire in this region with regard to specific desired tire characteristics. In order to be able to vary specific tire characteristics in this region, it is known to introduce additional load-carrying inserts or to provide expensive and/or complicated rubber profilings in the shoulder region and in the lower sidewall region.

It is an object of the present invention to improve a tire of the aforementioned general type in such a way that specific tire characteristics can be established or altered in a simple manner, and in particular that forces from the bead region can be introduced into the region of the edge of the belt.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
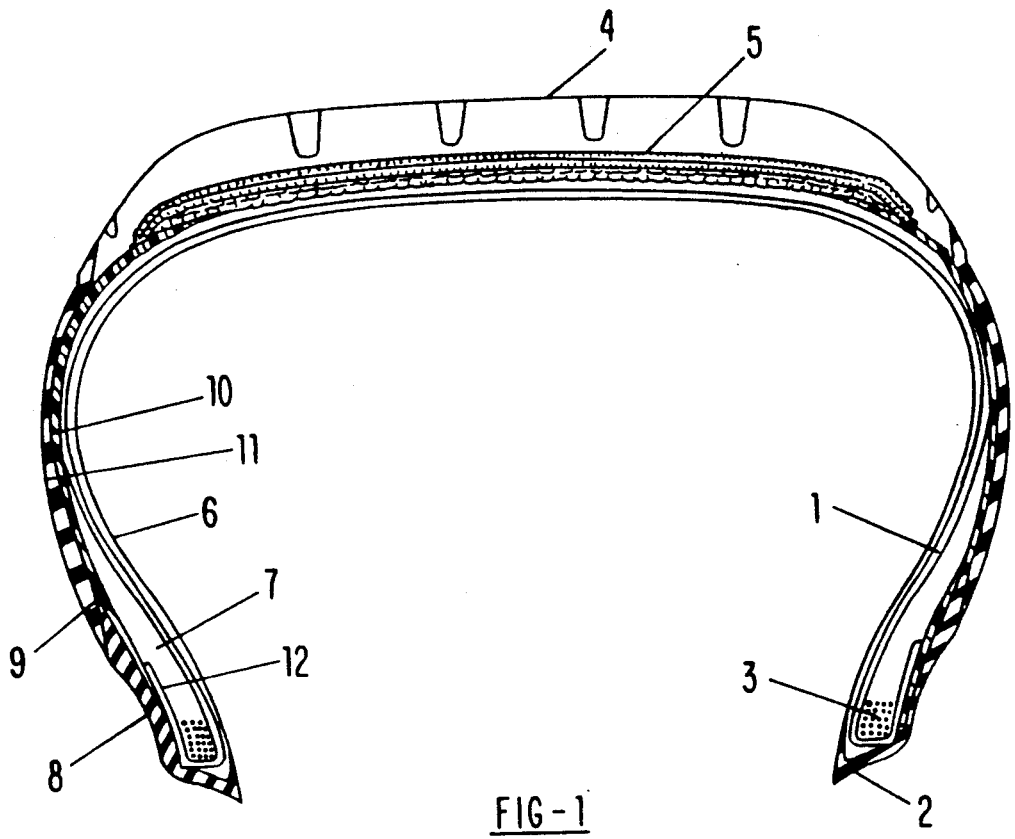
FIG. 1 is a partial radial cross-sectional view through one exemplary embodiment of the inventive pneumatic vehicle tire showing a two-layer sidewall rubber portion.
Figure 2:
FIG. 2 is a cross-sectional view showing a tire component comprising an outer sidewall rubber layer and a bead rubber member.

The pneumatic vehicle tire of the present invention is characterized primarily in that each of the sidewall rubber portions comprises two distinct rubber layers of different mixture compositions, namely an outer sidewall rubber layer that is resistant to the effects of ozone, is wear resistant, and is readily moldable, and an inner sidewall rubber layer that is designed to achieve an increased transfer of forces. The inventive methods of producing such a tire are characterized primarily in that the bead rubber member and the two rubber layers of the sidewall rubber portions are either manufactured as three separate components and are then applied, or as two components, with the outer sidewall rubber layer and the bead rubber member forming a unit, or alternatively as a single component. The two rubber layers of the sidewall rubber portions can have a planar configuration or can be profiled. By varying the thickness of the inner sidewall rubber layer at various locations along its length, and by selecting a particular Shore hardness as well as other mixture parameters, a multiplicity of different properties can be produced for the tire in the sidewall region. For example, it is in particular possible to influence the introduction of force from the rim all the way to the tread via the sides of the tire. This possibility for having an impact can be even further reinforced by a combination of further structural features, for example the height of the core profile, the amount by which the carcass is looped about the bead cores, how far out the bead profile extends, and the use of further bead-reinforcing components. By an appropriate use of the inner sidewall rubber layer, it is also possible to replace individual load-carrying inserts in the carcass region as well as bead-reinforcing components. To increase the transfer of forces or to increase the rigidity or stability of the tire, the inner sidewall rubber layer should preferably have a modulus of elasticity that is two to three times as great as that of the outer sidewall rubber layer, and should have a Shore hardness that is 10 to 50% greater than that of the outer sidewall rubber layer. With the present invention, it is in particular possible to improve the following characteristics; stability when traveling straight ahead, stability in curves steering response properties, precision of steering at high speeds, and driving stability in all speed ranges. A reinforcement or strengthening of the outer and inner sidewall portions is achieved in the region between the rim flanges and the bead core to below the edges of the belt.

Various expedient specific embodiments of the present invention are possible and will now be discussed. Although it is possible in principle for the two rubber layers of the sidewall rubber portions to have the same thickness at all locations along their cross-section, so that they could be made from sheet-like material, pursuant to one preferred embodiment of the present invention, the sidewall rubber layers have a profiled cross-sectional configuration; in other words, different portions along the length of the rubber layers have different cross-sectional configurations, i.e. at certain locations, the sidewall rubber layers have different cross-sectional configurations. In this way, in each region optimally desired properties can be produced by varying the cross-sectional configuration. Pursuant to one preferred specific embodiment, the two layers of the sidewall rubber portions extend essentially parallel to one another in their central portions. The inner layer of the sidewall rubber portion leaves the outer layer in the shoulder portion of the tire and extends parallel to the carcass to the region between the belt and the carcass, where this inner layer can extend approximately 1 to 2 cm below the edge of the belt. In a radially inward direction, the inner layer of the sidewall rubber portion can extend to where the carcass is looped about the bead core or even to the level of the bead core itself.

The edges of the tread strip and of the bead rubber member are enclosed in an acute-angled or wedge-shaped manner by the outer and inner layers of the sidewall rubber portions.

Further specific features of the present invention will be described in detail subsequently.

Description of Preferred Embodiments

Referring now to the drawing in detail, the pneumatic vehicle tire illustrated in FIG. 1 is built up essentially of rubber or rubber-like synthetic materials and has a radial carcass 1 that is anchored in the bead regions 2 by being looped around pull-resistant or inextensible bead cores 3. Disposed between the tread strip 4 and the carcass 1 is a conventional reinforcing belt 5. The interior of the tire is closed off by an air-tight inner layer 6. Disposed radially outwardly of the bead cores 3 are core riders 7 that provide a core profile that can extend out to beyond the middle height of the tire. A bead rubber member 8 extends around the bead region 2, with the tip or end 9 of this bead rubber member 8 extending approximately to one third of the height of the cross-sectional configuration of the tire.

The sidewall rubber, which is disposed laterally outwardly of the carcass 1, comprises two layers, namely an inner sidewall rubber layer 10 and an outer sidewall rubber layer 11. The outer sidewall rubber layer 11 has a rubber composition such as that which is generally customary for sidewall rubber, and consequently has a Shore hardness of about 55-60 Shore A. In order to satisfy the requirements that arise, this rubber must be resistant to the effects of ozone, must be wear resistant, and must be readily moldable. In a radially inward direction, the outer sidewall rubber 11 adjoins the bead rubber member 8 in an acute-angled or wedge-shaped manner. In the middle area of the cross-sectional height of the tire, the sidewall rubber layer 11 extends parallel to the inner sidewall rubber layer 10. Radially outwardly, the outer sidewall rubber layer 11 ends in the shoulder region of the tire at the edge of the tread strip 4.

The inner sidewall rubber layer 10 comprises a profiled or shaped strip that radially inwardly extends to the level of the bead core 3, where it rests against the looped-around portion 12 of the carcass 1. The bead rubber member 8 is enclosed in an acute-angled or wedge-shaped manner by the inner sidewall rubber layer 10 and the outer sidewall rubber layer 11. In the middle area of the cross-sectional height of the tire, the inner sidewall rubber layer 10 extends parallel to the outer sidewall rubber layer 11, subsequently extending parallel to the carcass 1 and ending in the edge region of the belt 5, extending approximately 1 to 2 cm into the area between the belt 5 and the carcass 1. The edge of the tread strip 4 is also enclosed in an acute-angled or wedge-shaped manner by the two sidewall rubber layers 10 and 11. The mixture composition of the inner sidewall rubber layer 10 is designed primarily with a view toward providing a good transfer of forces. The hardness can be between 60 to 75 Shore A. The thickness of the two sidewall rubber layers is at least 0.5 mm and at most 80% of the entire thickness of the sidewall. Furthermore, the inner sidewall rubber layer should have a higher absorbtion or cushioning property than does the outer sidewall rubber layer.

Figure 3:
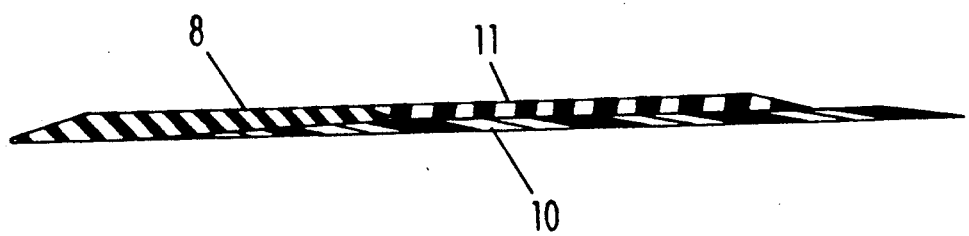
FIG. 3 is a cross-sectional view showing a tire component comprising an inner sidewall rubber layer, an outer sidewall rubber layer and a bead rubber member.

The tire just described can be produced in various ways. For example, it is possible to produce the inner sidewall rubber layer 10, the outer sidewall rubber layer 11, and the bead rubber member 8 as separate components, whereby during build-up of the tire, these components are successively applied in the following sequence: inner sidewall rubber layer 11, bead rubber member 8, and outer sidewall rubber layer 11. A simplification of the tire build-up can be achieved by producing the outer sidewall rubber layer 11 and the bead rubber member 8 as a single or unitary component via a doubling process, whereupon during the tire build-up, this component is placed upon the inner sidewall rubber layer 10 after application thereof. Finally, the most expedient manufacturing process would be to first produce a single or unitary component from all three of the aforementioned rubber parts, for example by extrusion via a so-called triplex extrusion head (see FIG. 3), and then applying this component during tire build-up. This last-mentioned manufacturing process minimizes the inaccuracies that can occur when rubber components are placed upon an unfinished or green tire.

The present invention is, of course, in no way restricted to the specific disclosure of the specification and drawings, but also encompasses any modifications within the scope of the appended claims.

What I claim is:

1. A pneumatic vehicle tire of elastomeric material, including a carcass that is anchored in bead regions by being looped around inextensible bead cores, and also including a reinforcing belt that is disposed between said carcass and a tread strip, with said tire further comprising:
    respective bead rubber members that each extend around one of said bead regions; and
    respective sidewall rubber portions that are disposed on laterally outer sides of said carcass and essentially extend from one of said bead rubber members to a shoulder region of said tire, with each of said sidewall rubber portions comprising two distinct rubber layers of different mixture compositions, with an inner sidewall rubber layer having a Shore A hardness that is 10 to 50% greater than that of an outer sidewall rubber layer, with edge portions of said tread strip and of said bead rubber members being enclosed in a wedge-shaped manner between said inner and outer sidewall rubber layers.

2. A tire according to claim 1, wherein at certain locations, said sidewall rubber layers have different cross-sectional configurations.

3. A tire according to claim 1, wherein central portions of said sidewall rubber layers extend essentially parallel to one another.

4. A tire according to claim 1, wherein each of said inner sidewall rubber layers extends radially outwardly to where it is disposed between said belt and said carcass.

5. A tire according to claim 1, wherein each of said inner sidewall rubber layers extends radially inwardly to the level of a looped-around portion of said carcass.

6. A tire according to claim 1, wherein each of said inner sidewall rubber layers extends radially inwardly to the level of one of said bead cores.

* * * * *